United States Patent
Lin

(10) Patent No.: US 9,605,742 B2
(45) Date of Patent: Mar. 28, 2017

(54) LARGE-RATIO STRAIN WAVE GEARING SPEED CHANGING APPARATUS

(71) Applicant: Panchien Lin, Chunglin (TW)

(72) Inventor: Panchien Lin, Chunglin (TW)

( * ) Notice: Subject to any disclaimer, the term of this patent is extended or adjusted under 35 U.S.C. 154(b) by 57 days.

(21) Appl. No.: 14/457,523

(22) Filed: Aug. 12, 2014

(65) Prior Publication Data

US 2014/0345407 A1   Nov. 27, 2014

Related U.S. Application Data

(63) Continuation-in-part of application No. 13/289,477, filed on Nov. 4, 2011, now Pat. No. 8,979,697.

(60) Provisional application No. 61/410,245, filed on Nov. 4, 2010.

(51) Int. Cl.
   *F16H 49/00*   (2006.01)

(52) U.S. Cl.
   CPC ..... *F16H 49/001* (2013.01); *F16H 2049/003* (2013.01); *Y10T 74/19642* (2015.01)

(58) Field of Classification Search
   CPC ............. F16H 49/001; F16H 2049/003; F16H 2049/008; F16H 49/00
   See application file for complete search history.

(56) References Cited

U.S. PATENT DOCUMENTS

| | | | |
|---|---|---|---|
| 1,942,794 A | 1/1934 | Benson | |
| 1,942,795 A | 1/1934 | Benson | |
| 4,512,213 A | 4/1985 | Newton | |
| 8,152,676 B2 | 4/2012 | Kobayashi et al. | |
| 2007/0039414 A1* | 2/2007 | Takemura | F16H 49/001 74/640 |
| 2007/0204723 A1* | 9/2007 | Saito | F16H 49/001 74/640 |
| 2010/0066039 A1 | 3/2010 | Koch et al. | |
| 2013/0319151 A1* | 12/2013 | Kanai | F16H 49/001 74/412 R |
| 2015/0107387 A1* | 4/2015 | Kuo | F16H 49/001 74/412 R |

* cited by examiner

*Primary Examiner* — Huan Le
(74) *Attorney, Agent, or Firm* — Allen, Dyer, Doppelt, Milbrath & Gilchrist, P.A.

(57) ABSTRACT

A strain wave gearing speed changing apparatus has a coaxial pair of circular splines including a first with tooth number $T_A$ and a second with $T_D$. A coaxial pair of flex splines includes a first with tooth number $T_B$ and a second with $T_C$. First flex spline meshes first circular spline and second flex spline meshes second circular spline at two, preferably more, meshing engagements. A wave generator is connected to one of the input and output shafts. Two flex splines are fixed together to operate flexingly on the wave generator with equal spline tooth engagement pitch circle circumference lengths. One circular spline is fixed to the apparatus frame and the other is connected to the other of the input and output shafts not connected to the wave generator. The four splines satisfy $T_A=T_K+T_i$, $T_B=T_K$, $T_C=T_K-T_j$ and $T_D=T_K+T_i-T_j$.

23 Claims, 12 Drawing Sheets

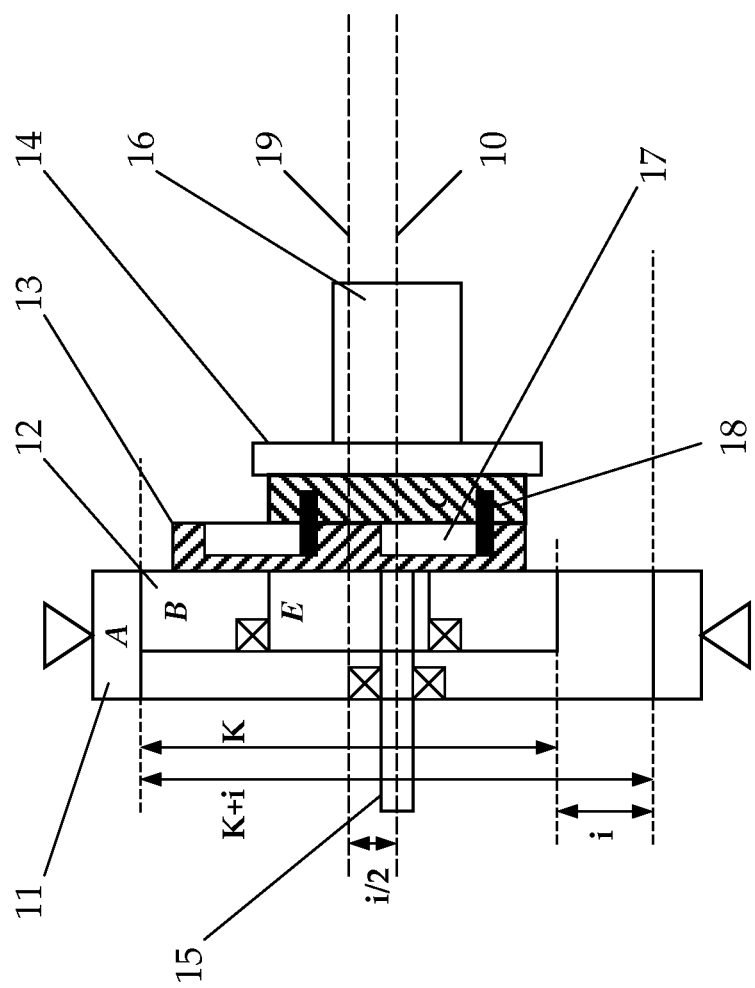
FIG. 1 ~ Prior Art

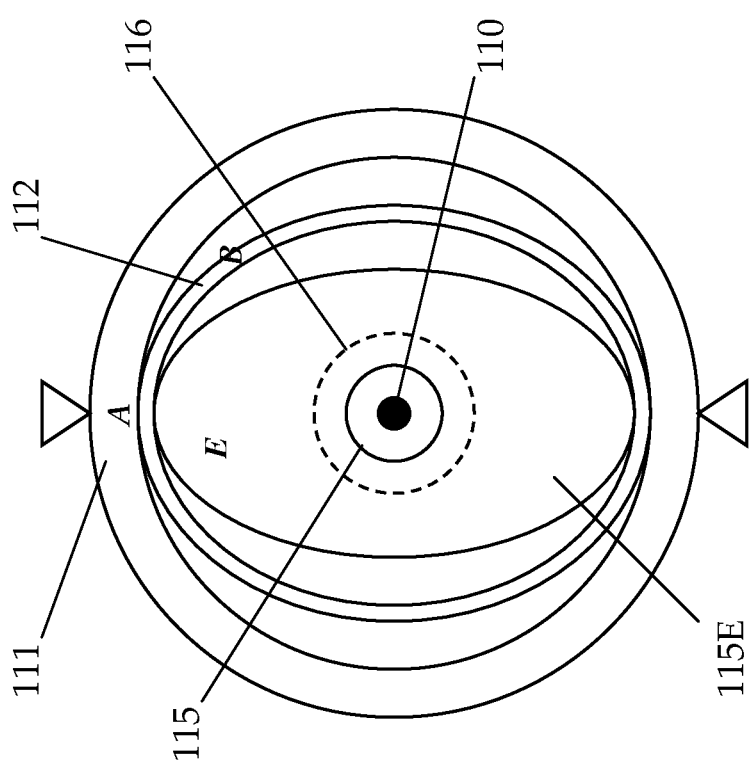
FIG. 1A ~ *Prior Art*

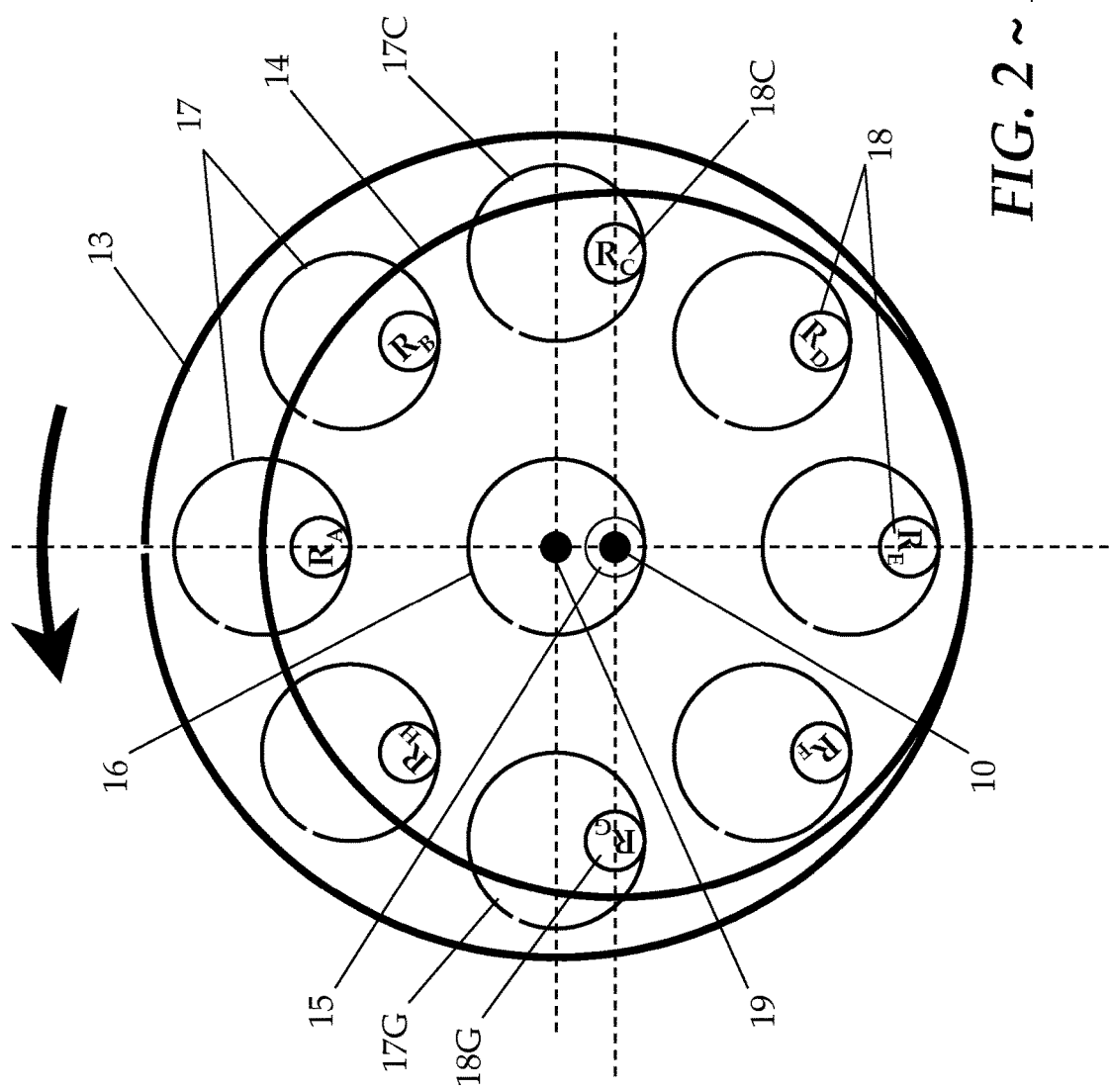
FIG. 2 ~ Prior Art

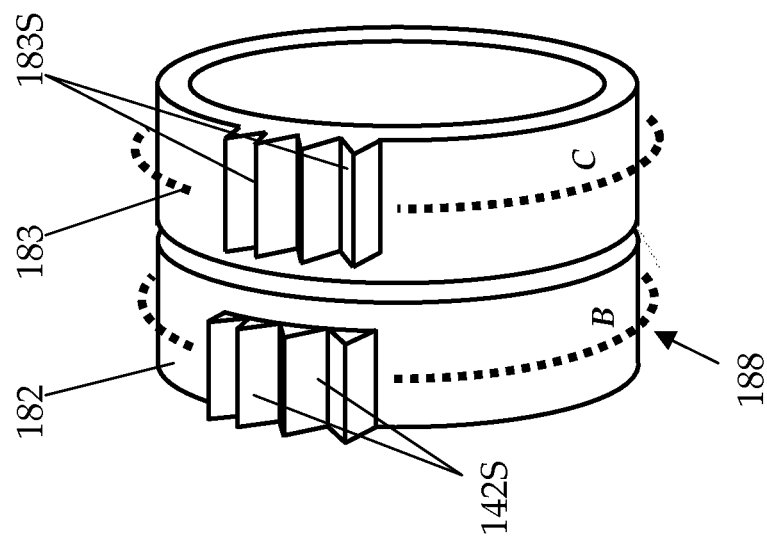
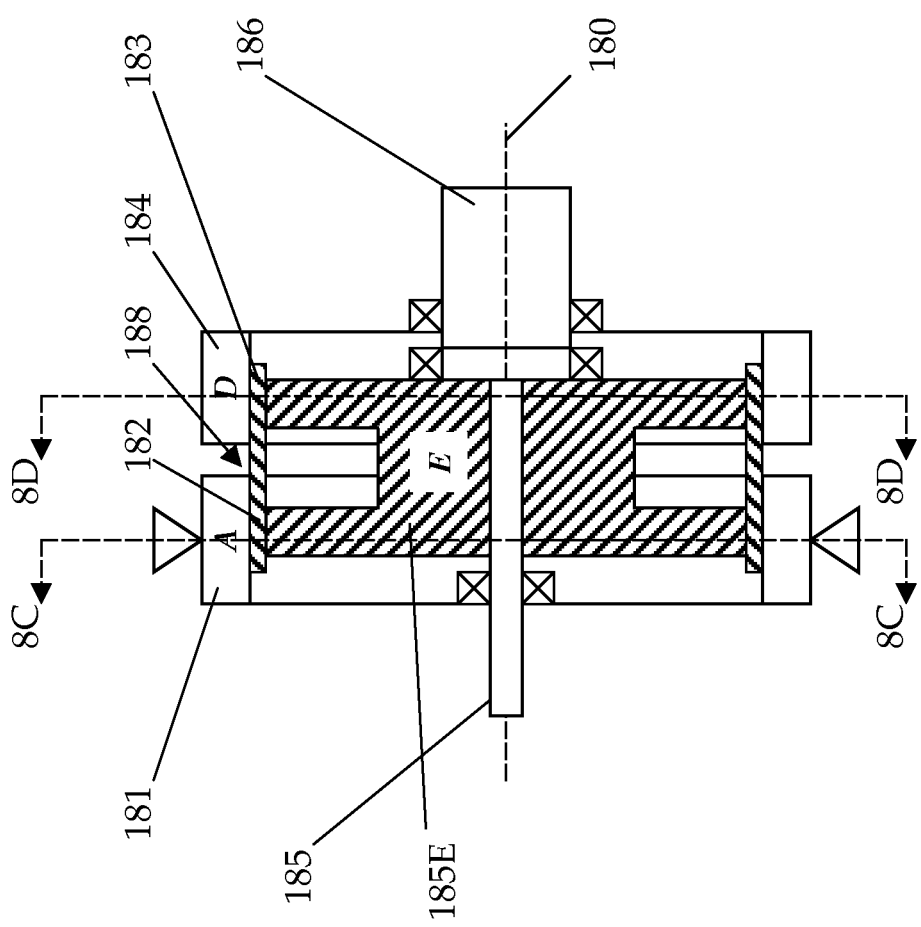
FIG. 8B
FIG. 8A

LARGE-RATIO STRAIN WAVE GEARING SPEED CHANGING APPARATUS

CROSS-REFERENCE TO RELATED APPLICATIONS

This application is a Continuation-in-Part of U.S. patent application Ser. No. 13/289,477 filed Nov. 4, 2011, which claims benefit of U.S. Provisional Application Ser. No. 61/410,245 filed Nov. 4, 2010, the disclosure which is hereby incorporated by reference in its entirety.

BACKGROUND

Field of the Invention

The present invention relates in general to speed changing apparatus and, in particular, to large-ratio speed changing apparatus. More particularly, the present invention relates to a large-ratio strain wave gearing speed changing apparatus for both speed reduction and speed increase applications with improved power capacity and service life.

Description of the Related Art

Speed changing is indispensable. Frequently a prime mover must work at high rotational speeds for optimized efficiency while the load it drives must run at tenths or even hundredths its speed. One way to obtain such large speed reduction ratio is to use a cascade of individual reducers of smaller ratio but each at its best efficiency.

However, this cascaded speed reduction suffers in overall speed-changing efficiency due to its nature of having the entire load passing successively through each and every reducer stage of the cascade. The arrangement is also bulky for the obvious reason that each stage in the cascade must be fully rated to handle one hundred percent of the total power delivered by the prime mover.

One type of "single-stage" reducers currently used widely is the cycloidal drive manufactured by Sumitomo Heavy Industries, Ltd. of Tokyo, Japan. Although relatively compact for speed-changing ratios ranging from tens to more than one hundred, the single-stage drive is, essentially, one cycloidal gearing half stage followed by an off-axis power extraction half stage.

FIG. 1 schematically illustrates the configuration of such a cycloidal speed reducer in cross section. The conventional device in FIG. 1 has a fixed ring gear 11 and a shaped planet element 12, sometimes a shaped disc or sometimes simply a gear. The planet element 12 engages with and moves inside the ring gear 11 epicyclically, or, hypocyclically in the conventional sense. The two have an as-small-as-possible difference in their working pitch diameters, or tooth numbers for that matter.

For the off-axis power extraction stage, a disc 13 is fixed to the planet element 12 coaxially on their axis 19 and has a number of round holes 17 to allow for engagement by a corresponding number of roller pins 18 planted on the plate 14. In many occasions the holes 17 are formed directly in the element 12, sparing the use of disc 13. This round plate 14 is coupled to the output shaft 16 of the drive and is centered on the central axis 10 of the device. This "power extraction" arrangement allows the drive to deliver a speed-reduction ratio of −K/i, wherein K is the pitch diameter of the planet element 12 and i is the difference between the pitch diameters of elements 11 and 12. In a typical example wherein the ring gear 11 has 80 teeth and a gear version of the planet element 12 has 79 (K=80 mm and i=1 mm using module 1 metric gears), the ratio is −80 when mechanical power is transmitted by the device via the input at shaft 15.

FIG. 2 schematically illustrates the off-axis power extraction coupling used for the prior art cycloidal drive of FIG. 1. At any given time, only one of the typically eight or more pin-roller and cycloidal disc hole engagements is transmitting torque fully. For example, with the angular position of the relative offset and with the direction of rotation as shown, only the pair of pin roller 18C and hole 17C is transmitting power fully for the device.

This is obvious as the edge of the hole 17C of the driving disc 13 that is in contact with the pin roller 18C of the driven plate 14 must be behind the roller 18C along the direction of rotation. In this sense pin roller and hole pairs identified by rollers $R_B$ and $R_D$ are partially working to transmit power because of the location of their contact points relative to the direction of rotation of the disc 13 and plate 14. In the same sense, the pin-roller and hole pair 18G and 17G is not working at all because the pin roller 18G, the driven, travels behind its contact point with its hole 17G, the driver.

Conventional cycloidal drives rely on a synchronizing engagement between two elements (gears) of different pitch diameter with offset axes. But this is not an optimized mechanism due to low utilization: Of all eight pin/hole pairs shown in FIG. 2, half (four or even five depending on the angular position) of them are not in the position to drive the load. Of the other half, only one can be in a full-effort position to drive the load, the other three are in their partial effort. With limitations such as these, cycloidal drives achieve typically less than 80 percent efficiency under normal load conditions.

Further, to achieve a speed reduction ratio of K, a cycloidal drive requires a fixed ring gear of K+1 teeth. For large ratio, the large ring gear number makes the drive bulky if the rated torque is substantial therefore the teeth must be sufficiently robust—in size. In other words, compactness of the cycloidal drive places a limitation on the torque and power rating of the drive.

Due to advantages such as no backlash, compactness and simple construction, another type of large-ratio reducer widely used in precision and aerospace applications is the harmonic drive manufactured by Harmonic Drive Systems Inc. of Tokyo, Japan. Operating the basic concept known as strain wave gearing, harmonic drive is relatively low in available power rating. The drive also delivers typically less than 60 percent efficiency under normal load because its spline element flexes all the time as the drive operates to transmit mechanical power.

FIG. 1A schematically illustrates the configuration of such a strain wave gearing speed reducer in cross section. The conventional device in FIG. 1A has a fixed circular spine 111 and a flex spline 112. The flex spline 112 engages with and moves inside the circular spine 111 flexingly when driven by the wave generator 115E through input shaft 115 of the drive. In the illustrated example of FIG. 1A, with the flex spline 112 having a tooth number of K and the circular spline K+i, the speed reduction ratio of the device at the output shaft 116 is −K/i.

Essentially the same as in the case of a cycloidal drive, for a strain wave gearing device to have large speed changing ratio, the two spline components must have an as-small-as-possible difference in their respective working tooth numbers. Although physically different in construction compared to cycloidal drives, conventional strain wave gearing speed changing devices suffer the same drawbacks in terms of characteristics such as power rating and power-to-weight ratio described above.

In addition to large-ratio speed reducers there are also the need to increase a slow input speed to an output up to tens, hundreds of times or more faster. Speed increasing is the opposite of reducing in terms of speed change ratio but is also important in many applications.

SUMMARY OF THE INVENTION

It is an object of the present invention to provide a strain wave gearing speed changing apparatus for large-ratio speed changing that has increased power density using two or more meshing engagements.

It is also an object of the present invention provide a strain wave gearing speed changing apparatus for large-ratio speed changing that has improved efficiency due to reduced flexing in the components.

It is also an object of the present invention provide a strain wave gearing speed changing apparatus for large-ratio speed changing that has improved service life due to reduced flexing in the components.

In order to achieve the above and other objects, the present invention a strain wave gearing speed changing apparatus for changing an input speed to an output either greatly slower or faster, the apparatus has a coaxial pair of circular splines that includes a first circular spline having a tooth number $T_A$ and a second circular spline having a tooth number $T_D$. A coaxial pair of flex splines includes a first flex spline having a tooth number $T_B$ and a second flex spline having a tooth number $T_C$. The first flex spline meshes with the first circular spline and the second flex spline meshes with the second circular spline at two, preferably more meshing engagements. A wave generator is connected to one of the input and output shafts of the apparatus. Two flex splines of one of the two coaxial pairs being fixed together to operate flexingly on the wave generator. One circular spline is fixed to the frame of the apparatus and the other circular spline is connected to the other of the input and output shafts. In the apparatus, the four splines satisfy the dimensional relationship of $T_A=T_K+T_i$, $T_B=T_K$, $T_C=T_K-T_j$ and $T_D=T_K+T_i-T_j$.

The present invention also provides a strain wave gearing speed changing apparatus for changing an input speed to an output either greatly slower or faster, the apparatus has a coaxial pair of circular splines that includes a first circular spline having a tooth number $T_A$ and a second circular spline having a tooth number $T_D$. A coaxial pair of flex splines includes a first flex spline having a tooth number $T_B$ and a second flex spline having a tooth number $T_C$. The first flex spline meshes with the first circular spline and the second flex spline meshes with the second circular spline. A wave generator is connected to one of the input and output shafts of the apparatus. Two flex splines are fixed together to operate flexingly on the wave generator that may have equal spline tooth engagement pitch circle circumference lengths. One circular spline is fixed to the frame of the apparatus and the other circular spline is connected to the other of the input and output shafts. In the apparatus, the four splines satisfy the dimensional relationship of $T_A=T_K+T_i$, $T_B=T_K$, $T_C=T_K-T_j$ and $T_D=T_K+T_i-T_j$.

The present invention further provides a strain wave gearing speed changing apparatus for changing an input speed to an output either greatly slower or faster, the apparatus has a coaxial pair of circular splines that includes a first circular spline having a tooth number $T_A$ and a second circular spline having a tooth number $T_D$. A coaxial pair of flex splines includes a first flex spline having a tooth number $T_B$ and a second flex spline having a tooth number $T_C$. The first flex spline meshes with the first circular spline and the second flex spline meshes with the second circular spline at one single meshing engagement. A wave generator is connected to one of the input and output shafts of the apparatus. Two flex splines are fixed together to operate flexingly on the wave generator that may have equal spline tooth engagement pitch circle circumference lengths. One circular spline is fixed to the frame of the apparatus and the other circular spline is connected to the other of the input and output shafts. In the apparatus, the four splines satisfy the dimensional relationship of $T_A=T_K+T_i$, $T_B=T_K$, $T_C=T_K-T_j$ and $T_D=T_K+T_i-T_j$.

BRIEF DESCRIPTION OF THE DRAWINGS

FIG. 1 schematically illustrates a prior art large-ratio cycloidal speed reducer.

FIG. 1A schematically illustrates another prior art large-ratio strain wave gearing speed reducer.

FIG. 2 schematically illustrates the off-axis power extraction coupling used for a prior art cycloidal drive.

FIG. 8A schematically illustrates a cross-sectional view of another preferred embodiment of the strain wave gearing speed changing apparatus of the present invention outlining the dimensional configuration of all members thereof.

FIG. 8B schematically illustrates the double flex spline for the apparatus of FIG. 8A having equal spline tooth engagement pitch circle circumference lengths.

DETAILED DESCRIPTION OF THE PREFERRED EMBODIMENTS

Figure 3:
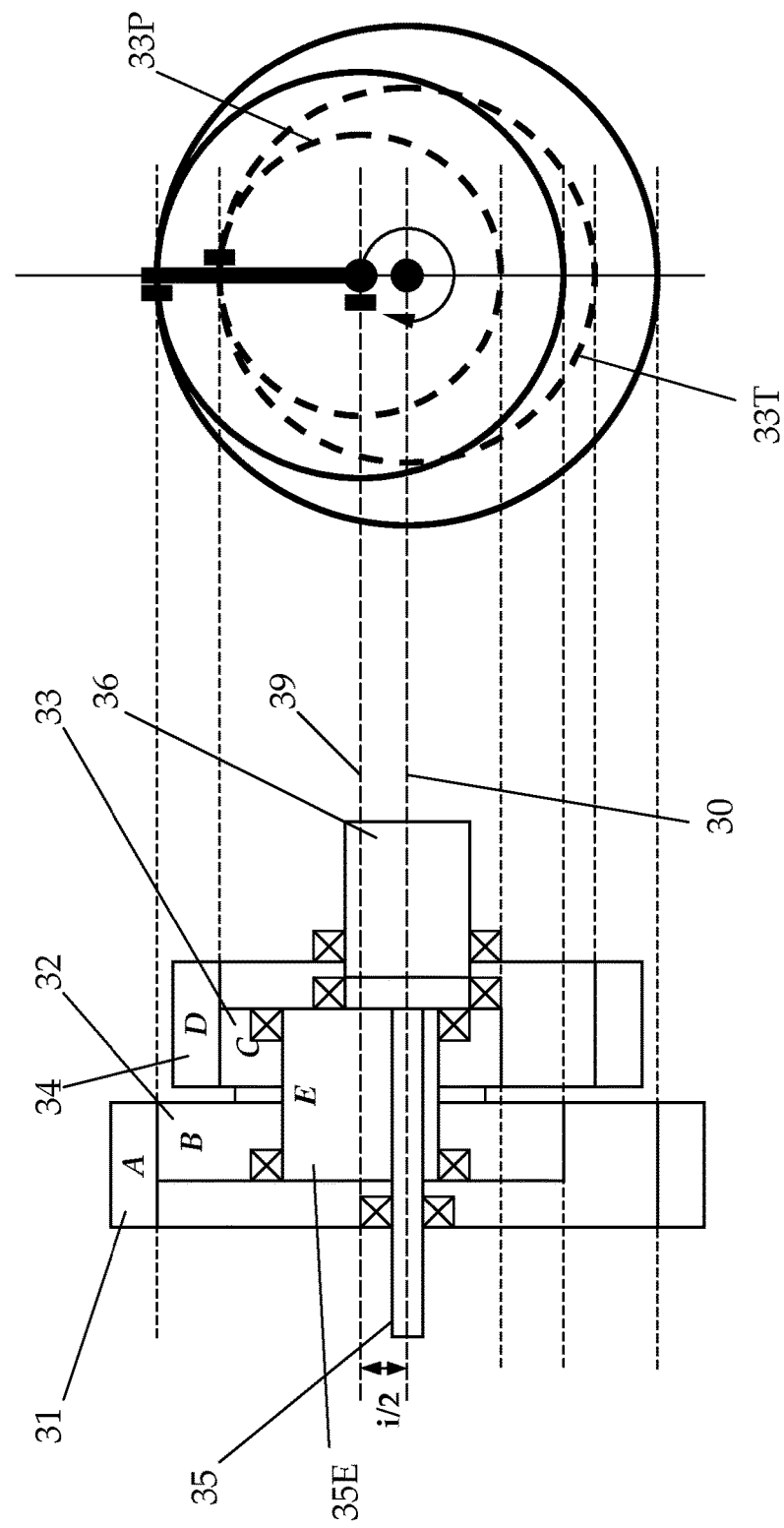
FIG. 3 is a cross-sectional view of a speed changing apparatus of the present invention that schematically illustrates the off-axis power extraction stage thereof.

FIG. 3 is a cross-sectional configuration of a speed changing apparatus of the present invention that schematically illustrates an equivalent arrangement of the off-axis power extraction stage thereof. With simultaneous reference also to FIGS. 1 and 2, instead of the plate 14 with multiple pin-rollers 18 that engages with their corresponding holes 17 formed in the cycloidal disc 13, a speed changing apparatus of the present invention has a different arrangement for power extraction.

As is illustrated, while the planet gear 32 moves epicyclically inside the frame ring gear 31 as a first ring-spur gear pair, another planet gear 33 that is fixed coaxially with gear 32 also moves epicyclically inside its ring gear 34, a second pair of ring-spur gears. As the gear 33 spins and moves epicyclically inside gear 34, its outer most edge (of its pitch circle) 33P plots a trace 33T. This trace 33T is made to exactly coincide with the pitch circle of the ring gear 34. Essentially, ring gear 34 of the second pair, together with its meshing spur gear 33, serves a similar function as the off-axis power extraction means of a conventional cycloidal drive but allows the present inventive apparatus to produce a speed change ratio that is much larger, as is described hereinafter.

Figure 4:
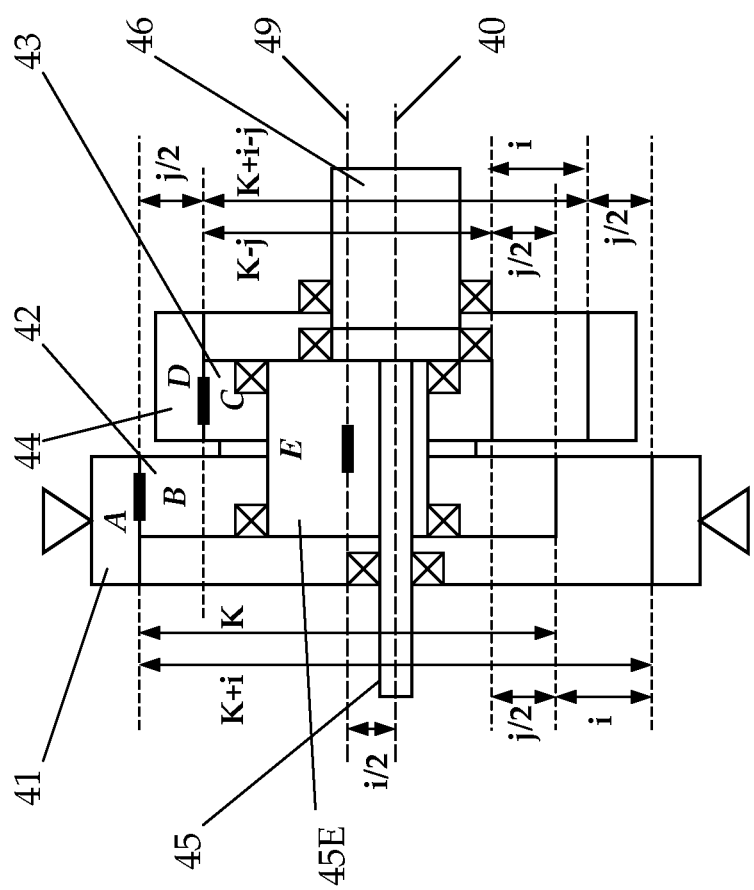
FIG. 4 schematically illustrates a cross-sectional view of a speed changing apparatus of the present invention outlining the dimensional configuration of all members thereof.

FIG. 4 schematically illustrates in a cross-sectional view the configuration of a speed changing apparatus of the present invention outlining the dimensional configuration of all members thereof. The speed changing apparatus has a coaxial pair of ring gears that includes a large ring gear 41 having a pitch diameter A and a small ring gear 44 having a pitch diameter D. The apparatus also has a coaxial pair of spur gears that includes a large spur gear 42 having a pitch diameter B and a small spur gear 43 having a pitch diameter C. The large spur gear 42 meshes with the large ring gear 41 and the small spur gear 43 meshes with the small ring gear 44, forming two meshing pairs. A carrier member 45E is connected to the input shaft 45 of the speed changing apparatus. The carrier member 45E, essentially a "twisted"—very short arm—version of that found in conventional planetary gear, is formed by combining the input shaft 45 (on the central axis 40 of the entire system) and the central shaft for the pair of gears 42 and 43 (on its own axis 49).

Further, the two coaxial spur gears 42 and 43 are fixed together to each other to operate epicyclically on the carrier 45E. The large ring gear 41, in this depicted example of FIG. 4, is fixed to the frame of the apparatus serving as the reaction member of the system and the small ring gear 44 is connected to the output shaft 46.

In this gear train system, the four gears 41, 42, 43 and 44 satisfy the dimensional relationship of A=K+i, B=K, C=K−j and D=K+i−j wherein K is pitch diameter of the large spur gear 42, i is the difference of pitch diameters between the large ring gear 41 and large spur gear 42 (and also the difference of pitch diameters between the small ring gear 44 and small spur gear 43), and j is the difference of pitch diameters between the large ring gear 41 and small ring gear 44 (and also the difference of pitch diameters between the large spur gear 42 and small spur gear 43).

The speed changing apparatus of FIG. 4 has the carrier 45E acting as the input, the small ring gear 44 as the output, and the large ring gear 41 the reaction member. Meanwhile, the two coaxial spur gears 42 and 43 that are fixed together move epicyclically in the system. The illustrated speed changing apparatus of FIG. 4 has a speed change ratio of K(K+i−j)/ij. For a gear-based system with dimensions A, B, C and D pitch diameters that of 16T (teeth), 15T, 14T and 15T module 10 gears respectively, or, K=150 mm (15 cm), i=10 mm (1 cm) and j=10 mm (1 cm), the speed changing (reduction) ratio is 225. The apparatus can also be used for speed increasing by swapping the input and output assignment.

By contrast, a conventional cycloidal drive (of FIG. 1) with A pitch diameter that of a 16T gear and B of 15T, the speed-changing ratio is −15. This means a speed changing apparatus of the present invention is able to achieve a ratio that is the square in numerical value that of a cycloidal drive with comparable tooth number.

Figures 4A, 4B:
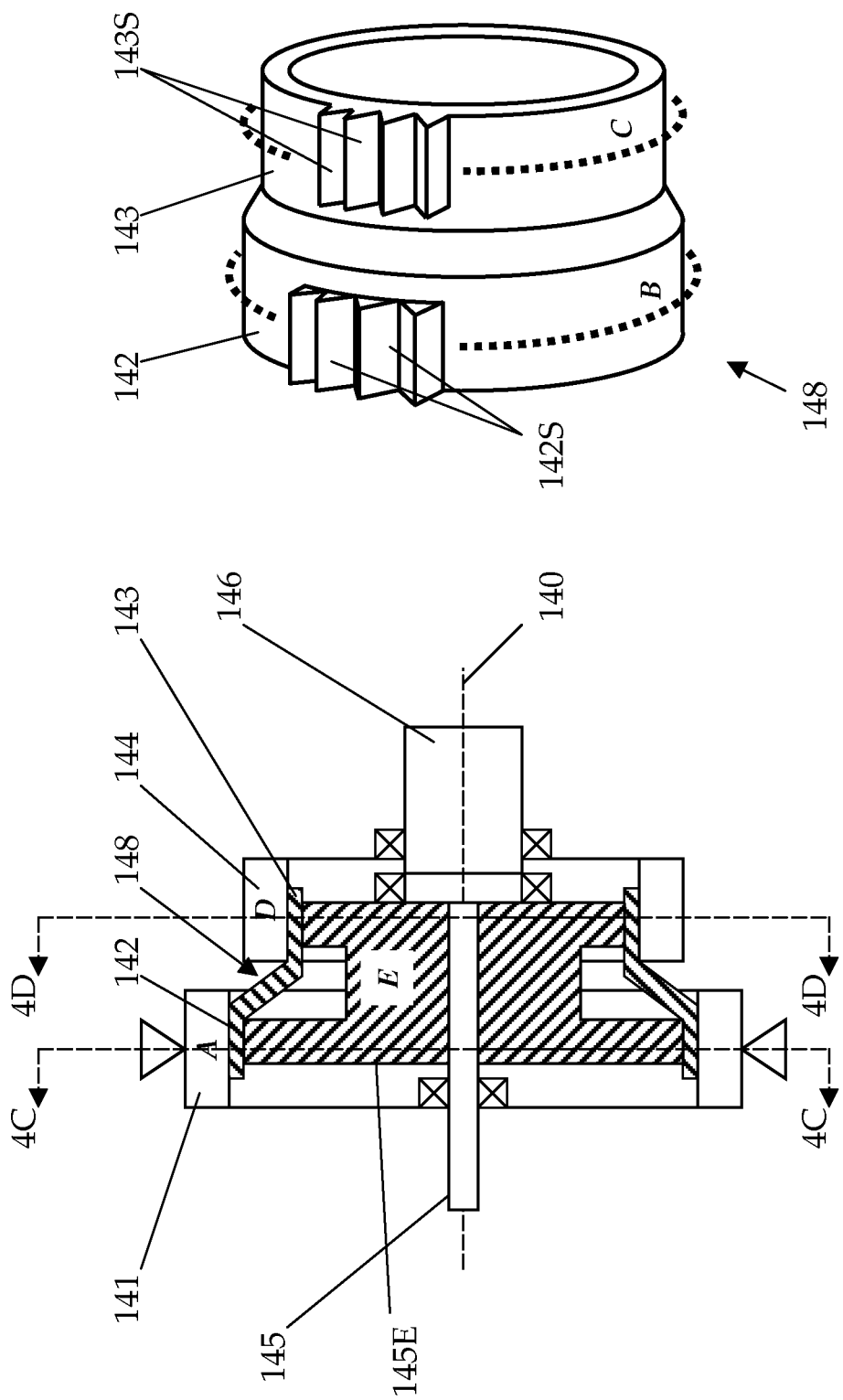
FIG. 4A schematically illustrates a cross-sectional view of a strain wave gearing speed changing apparatus of the present invention outlining the dimensional configuration of all members thereof.
FIG. 4B schematically illustrates the double flex spline for the apparatus of FIG. 4A.

FIG. 4A schematically illustrates a cross-sectional view of a strain wave gearing speed changing apparatus of the present invention outlining the dimensional configuration of all members thereof. The strain wave gearing speed changing apparatus has a coaxial pair of circular splines that includes a large circular spline 141 having a tooth number $T_A$ and a small circular spline 144 having a tooth number $T_D$. The apparatus also has a coaxial pair of flex splines that includes a large flex spline 142 having a tooth number $T_B$ and a small flex spline 143 having a tooth number $T_C$. The large flex spline 142 meshes with the large circular spline 141 and the small flex spline 143 meshes with the small circular spline 144, forming two meshing pairs. A wave generator 145E is connected to the input shaft 145 of the speed changing apparatus. The wave generator 145E is formed by combining the input shaft 145 (on the central axis 140 of the entire system) and the central shaft for the pair of flex splines 142 and 143.

Further, the two coaxial flex splines 142 and 143 are fixed together to each other to operate flexingly on the wave generator 145E. The large circular spline 141, in this depicted example of FIG. 4A, is fixed to the frame of the apparatus serving as the reaction member of the system and the small circular spline 144 is connected to the output shaft 146.

In this spline-based gear train system, the four splines 141, 142, 143 and 144 satisfy the tooth number relationship of $T_A=T_K+T_i$, $T_B=T_K$, $T_C=T_K-T_j$ and $T_D=T_K+T_i-T_j$ wherein $T_K$ is tooth number of the large flex spline 142, i is the difference between tooth numbers of large circular spline 141 and large flex spline 142 (and also the difference between tooth numbers of small circular spline 144 and small flex spline 143), and $T_j$ is the difference between tooth numbers of large circular spline 141 and small circular spline 144 (and also the difference between tooth numbers of large flex spline 142 and small flex spline 143).

The strain wave gearing speed changing apparatus of FIG. 4A may have the wave generator 145E acting as the input, the small circular spline 144 as the output, and the large circular spline 141 the reaction member. Meanwhile, the two coaxial flex splines 142 and 143 that are fixed together move flexingly in the system. The illustrated speed changing apparatus of FIG. 4A has a speed change ratio of $T_K(T_K+T_i-T_j)/T_iT_j$. For such a spline-based system with a tooth number of $T_A$=16T (teeth), $T_B$=15T, $T_C$=14T and $T_D$=15T, or, $T_K$=15, $T_i$=1 and $T_j$=1, the speed changing—reduction—ratio is 225. Certainly the apparatus can also be used for speed increasing by swapping the input and output assignment.

FIG. 4B schematically illustrates that the pair of flex splines 142 and 143 are fixed together to form a double flex spline component 148 for the speed changing apparatus of FIG. 4A. In a preferred embodiment of the strain wave gearing speed changing apparatus such as illustrated in FIG. 4A, component 148 can be made from one single piece of metallic tube. Two groups of spline teeth 142S and 143S are formed respectively on the exterior cylindrical surface of the flex splines 142 and 143. Note that only a few spline teeth are shown in the drawing although they will encircle the entire periphery of flex splines 142 and 143.

Figure 4D:
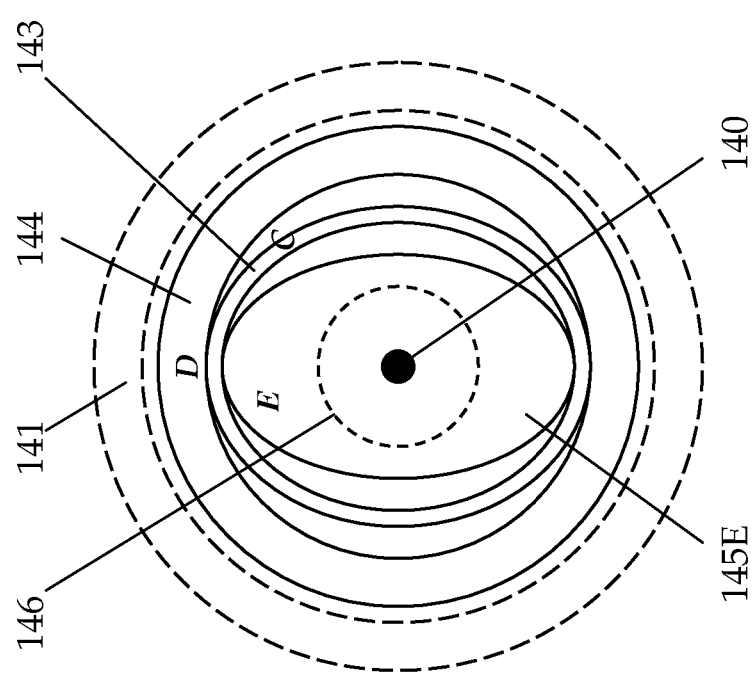
FIG. 4D schematically illustrates the cross-sectional view of the speed changing apparatus of FIG. 4A taken along the 4D-4D line.
Figure 4C:
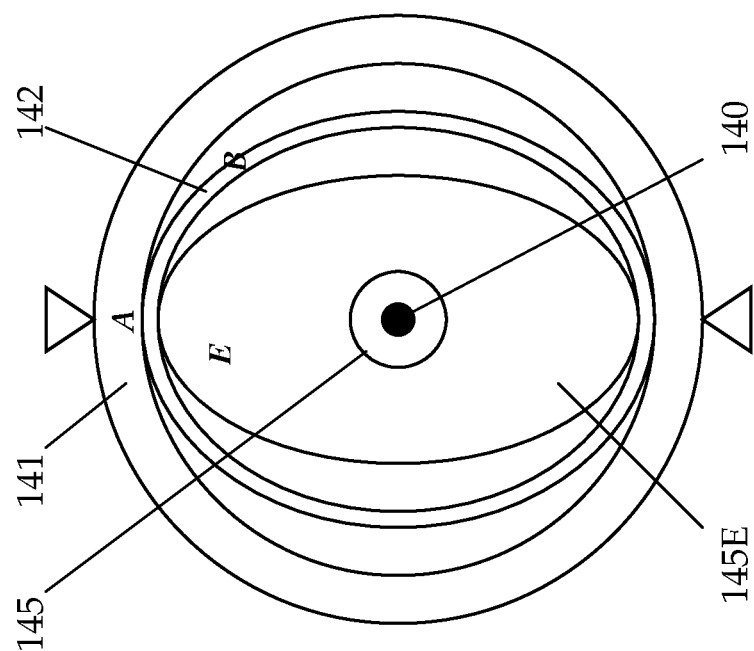
FIG. 4C schematically illustrates the cross-sectional view of the speed changing apparatus of FIG. 4A taken along the 4C-4C line.

FIG. 4C schematically illustrates the cross-sectional view of the speed changing apparatus of FIG. 4A taken along the 4C-4C line and FIG. 4D the cross-sectional view taken along the 4D-4D line.

A speed changing apparatus of the present invention can be used in different configurations of input, output and reaction member assignments among its constituent gear and carrier members. Essentially, a general-purpose speed changing apparatus of the present invention—used either as a speed reducer or an increaser having either a fixed ring gear or a fixed spur gear—can be constructed to have a coaxial pair of ring gears that includes a large ring gear having a pitch diameter A and a small ring gear having a pitch diameter D. Such an apparatus also has a coaxial pair of spur gears that includes a large spur gear having a pitch diameter B and a small spur gear having a pitch diameter C. The large spur gear meshes with the large ring gear and the small spur gear meshes with the small ring gear, forming two meshing pairs. A carrier member is connected to one of the input and output shafts of the apparatus. Two gears of one of the two coaxial pairs are fixed together to operate epicyclically on the carrier. One gear of the other of the two coaxial pairs is fixed to the frame of the apparatus and the other gear is connected to the other of the input and output shafts. In such a system, the four gears satisfy the dimensional relationship of $A=K+i$, $B=K$, $C=K-j$ and $D=K+i-j$.

Figures 5, 6:
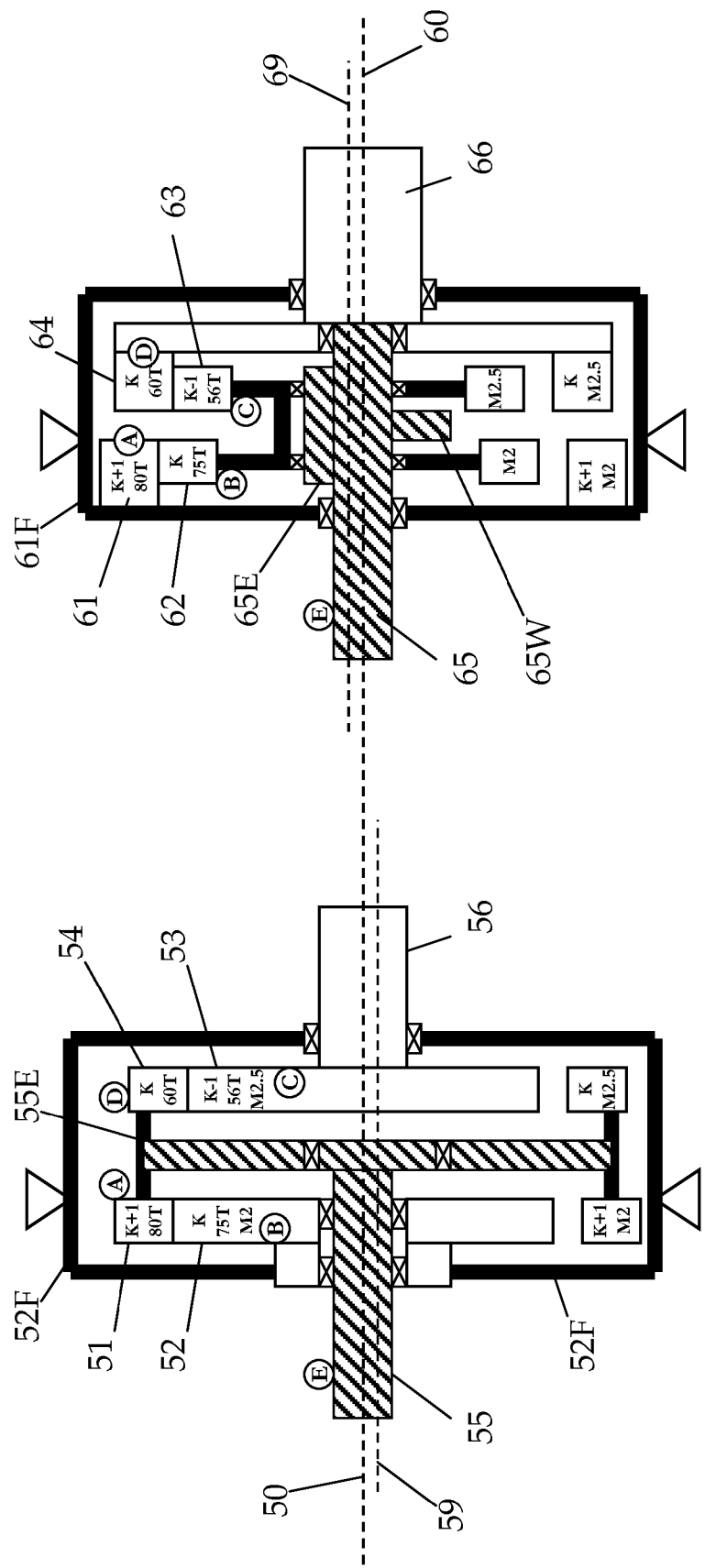
FIGS. 5 and 6 schematically illustrate cross-sectional views of the speed changing apparatus of the present invention in different input- and output-member arrangements.

FIGS. 5 and 6 schematically illustrate cross-sectional views of the speed changing apparatus of the present invention that are in different input- and output-member arrangements. The examples of FIGS. 5 and 6 show the construction of reducers with 200-plus speed reduction ratio using two ring-spur gear pairs of different module numbers. The first pair with large ring and spur gears includes an 80-tooth ring gear 51, 61 with a module number of 2 making a pitch diameter of 160 mm and a 75T, M2 spur gear 52, 62 with 150 mm pitch. The second pair of small ring and spur includes a 60T, M2.5 ring gear 54, 64 with 150 mm pitch and a 56T, M2.5 spur 53, 63 with 140 mm pitch. Thus, with the large spur gear fixed to the device frame 52F as the reaction member as is the configuration of FIG. 5, the speed changing apparatus delivers a reduction ratio of −224.

The apparatus of FIG. 6, on the other hand, has a different configuration although using all the same gears as in FIG. 5, essentially the same gear role assignment as that described in FIG. 4—with the large ring 61 fixed to device frame 61F as the reaction member.

Note that the examples of FIGS. 5 and 6 have a dimensional configuration of K:i:j=15:1:1 (75T×M2:(80T×M2−75T×M2):(80T×M2−60T×M2.5)=150 mm:10 mm:10 mm=15:1:1).

In summary, a speed changing apparatus of the present invention outlined in FIG. 4 may have four different speed-changing setup configurations, as listed in Table 1. In Table 1, as well as 2 below, R, O and I in the Role row indicate, respectively, the reaction, the output and the input roles of the rotary elements of the inventive apparatus.

| Element | Large Ring Gear 41 | Large Spur Gear 42 | Small Spur Gear 43 | Small Ring Gear 44 | Carrier Member 45E | Re- duction Ratio |
|---|---|---|---|---|---|---|
| Configuration 1 | | | | | | |
| Role Motion Speed | R Fixed 0 | — Epicyclic | — Epicyclic | O Rotary ij/(K + i − j) | I Rotary 1 | K(K + i − j)/ij |
| Configuration 2 | | | | | | |
| Role Motion Speed | O Rotary −ij/ (K − j) (K + i) | — Epicyclic | — Epicyclic | R Fixed 0 | I Rotary 1 | −(K − j)(K + i)/ij |
| Configuration 3 | | | | | | |
| Role Motion Speed | — Epicyclic | R Fixed 0 | O Rotary −ij/(K + i)(K − j) | — Epicyclic | I Rotary 1 | −(K + i)(K − j)/ij |
| Configuration 4 | | | | | | |
| Role Motion Speed | — Epicyclic | O Rotary ij/(K + i − j) | R Fixed 0 | — Epicyclic | I Rotary 1 | K(K + i − j)/ij |

As is comprehensible for those skilled in the art, the speed-reducing configurations in Table 1 can be easily changed into speed-increasing simply by swapping the I and O role assignment of each.

Figure 7:
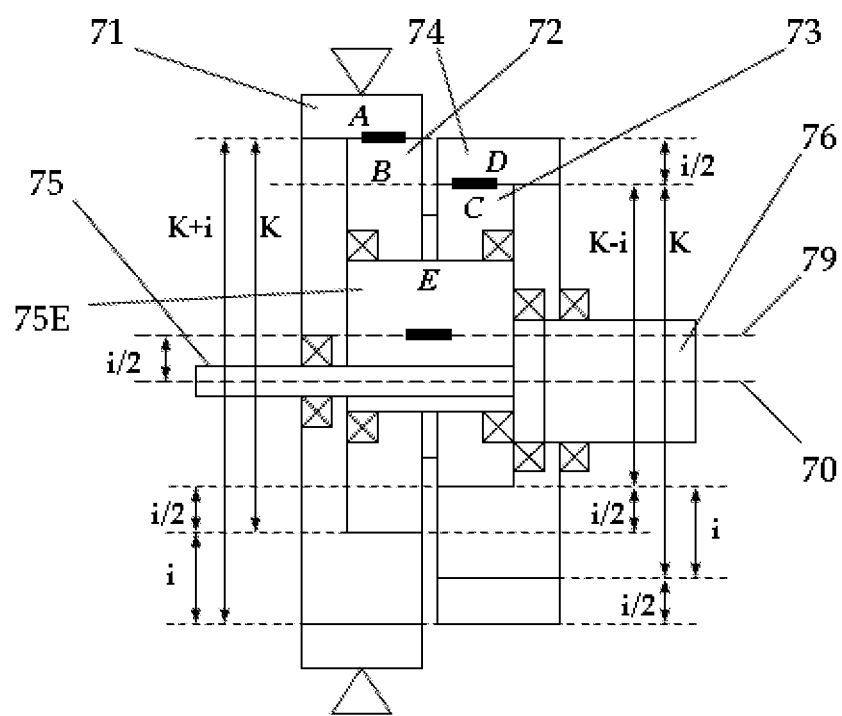
FIG. 7 schematically illustrates a cross-sectional view of a speed changing apparatus of the present invention with a dimensional configuration for optimized speed-changing application.

FIG. 7 schematically illustrates a cross-sectional view of a speed changing apparatus of the present invention that has a dimensional configuration optimized for speed-changing application in terms of weight and size, or power density. Under this special case, configurations in Table 1 become that listed in Table 2.

| Element | Large Ring Gear 71 | Large Spur Gear 72 | Small Spur Gear 73 | Small Ring Gear 74 | Carrier Member 75E | Re- duction Ratio |
|---|---|---|---|---|---|---|
| Configuration 1 | | | | | | |
| Role Motion Speed | R Fixed 0 | — Epicyclic | — Epicyclic | O Rotary $i^2/K^2$ | I Rotary 1 | $K^2/i^2$ |
| Configuration 2 | | | | | | |
| Role Motion Speed | O Rotary $-i^2/(K^2 - i^2)$ | — Epicyclic | — Epicyclic | R Fixed 0 | I Rotary 1 | $1 - K^2/i^2$ |
| Configuration 3 | | | | | | |
| Role Motion Speed | — Epicyclic | R Fixed 0 | O Rotary $-i^2/(K^2 - i^2)$ | — Epicyclic | I Rotary 1 | $1 - K^2/i^2$ |
| Configuration 4 | | | | | | |
| Role Motion Speed | — Epicyclic | O Rotary $i^2/K^2$ | R Fixed 0 | — Epicyclic | I Rotary 1 | $K^2/i^2$ |

Speed reduction ratios listed in Tables 1 and 2 show that with gears having tooth numbers centered at a value of K (with i and j values reduced to 1), a speed reducer of a ratio of, at the optimized case, $K^2$ can be constructed. This compares to the conventional cycloidal drive's reduction ratio of K.

Note, as is comprehensible, that a spur gear meshed inside a ring gear usually must have a tooth number sufficiently smaller than that of the ring. For example, with the popular 20-degree pressure angle gears, a minimum of 8-tooth difference is necessary. One typical approach to avoid gear interference for small tooth number difference is to employ profile shifting for the gears. Alternatively, with larger gear pressure angle, smaller tooth number difference without gear interference is possible.

Also, since the epicyclic elements of one coaxial pair of the speed-changing apparatus of the present invention is normally so large in size comparable to the other coaxial pair that only one pair is possible. A counterweight is therefore necessary in practical implementations of this inventive speed-changing apparatus, as is schematically illustrated as counterweight 65W in the embodiment depicted in FIG. 6. The counterweight is used to balance the mass of the epicyclic coaxial pair of gears opposite across the center axis of the apparatus.

A speed changing apparatus of the present invention outlined in FIG. 4A may have, practically, two different speed-changing setup configurations, as listed in Table 3. In Table 3 and 4 below, again, R, O and I in the Role row indicate, respectively, the reaction, the output and the input roles of the rotary elements of the inventive apparatus. These correspond to Configurations 1 and 2 in Tables 1 and 2 above that describe the speed changing apparatus of the present invention based on conventional gearing, either involute or cycloidal gearing. Strain wave gearing implementations of the present invention taking structural configuration similar to Configurations 3 and 4 in Tables 1 and 2 are possible, but are believed to be less practical. In other words, Configurations 1 and 2 in Tables 3 and 4 are the better implementation of the speed changing apparatus of the present invention.

| Element | Large Circular Spline 141 | Large Flex Spline 142 | Small Flex Spline 143 | Small Circular Spline 144 | Wave Generator 145E | Reduction Ratio |
|---|---|---|---|---|---|---|
| Configuration 1 | | | | | | |
| Role | R | — | — | O | I | $T_K(T_K + T_i - T_j)$ |
| Motion | Fixed | Flexing | Flexing | Rotary | Rotary | |
| Speed | 0 | | | $T_iT_j$ $T_K(T_K + T_i - T_j)$ | 1 $T_iT_j$ | |
| Configuration 2 | | | | | | |
| Role | O | — | — | R | I | $-(T_K - T_j)(T_K + T_i)$ |
| Motion | Rotary | Flexing | Flexing | Fixed | Rotary | |
| Speed | $-T_iT_j$ $(T_K - T_j)$ $(T_K + T_i)$ | | | 0 | 1 $T_iT_j$ | |

The strain wave gearing-based speed-reducing configurations in Table 3 can be easily changed into speed-increasing simply by swapping the I and O role assignment of each.

An optimized version of the apparatus of FIG. 4A—though not illustrated in the drawings but based on the same principle as that of the gearing version described in FIG. 7 as compared to FIG. 6—may have a dimensional configuration optimized for speed-changing application in terms of weight and size, or power density. Under this special case, configurations in Table 3 become that in Table 4.

| Element | Large Circular Spline 141 | Large Flex Spline 142 | Small Flex Spline 143 | Small Circular Spline 144 | Wave Generator 145E | Reduction Ratio |
|---|---|---|---|---|---|---|
| Configuration 1 | | | | | | |
| Role | R | — | — | O | I | $T_K^2/T_i^2$ |
| Motion | Fixed | Flexing | Flexing | Rotary | Rotary | |
| Speed | 0 | | | $T_i^2/T_K^2$ | 1 | |
| Configuration 2 | | | | | | |
| Role | O | — | — | R | I | $1 - T_K^2/T_i^2$ |
| Motion | Rotary | Flexing | Flexing | Fixed | Rotary | |
| Speed | $-T_i^2/(T_K^2 - T_i^2)$ | | | 0 | 1 | |

FIG. 8A schematically illustrates a cross-sectional view of another preferred embodiment of the strain wave gearing speed changing apparatus of the present invention outlining the dimensional configuration of all members thereof.

Essentially similar to the case in the embodiment of FIG. 4A, the strain wave gearing speed changing apparatus depicted has a coaxial pair of circular splines that includes a first circular spline 181 having a tooth number $T_A$ and a second circular spline 184 having a tooth number $T_D$. The apparatus also has a coaxial pair of flex splines that includes a first flex spline 182 having a tooth number $T_B$ and a second flex spline 183 having a tooth number $T_C$. The first flex spline 182 meshes with the first circular spline 181 and the second flex spline 183 meshes with the second circular spline 184, forming two meshing pairs. A wave generator 185E is connected to the input shaft 185 of the speed changing apparatus. The wave generator 185E is formed by combining the input shaft 185 (on the central axis 180 of the entire system) and the effective central shaft for the pair of flex splines 182 and 183.

Further, the two coaxial flex splines 182 and 183 are fixed together to each other to operate flexingly on the wave generator 185E. The first circular spline 181, in this depicted example of FIG. 8A, is fixed to the frame of the apparatus serving as the reaction member of the system and the second circular spline 184 is connected to the output shaft 186.

In this spline-based gear train system, the four splines 181, 182, 183 and 184 satisfy the tooth number relationship of $T_A = T_K + T_i$, $T_B = T_K$, $T_C = T_K - T_j$ and $T_D = T_K + T_i - T_j$ wherein $T_K$ is tooth number of the first flex spline 182, $T_i$ is the difference between tooth numbers of first circular spline 181 and first flex spline 182 (and also the difference between tooth numbers of second circular spline 184 and second flex spline 183), and $T_j$ is the difference between tooth numbers of first circular spline 181 and second circular spline 184 (and also the difference between tooth numbers of first flex spline 182 and second flex spline 183).

Compared to the conventional gearing implementations, dimensional configuration of the strain wave gearing implementation of the speed changing apparatus of the present invention, as described above, is required to satisfied a relationship among its four spline elements expressed in terms of spline tooth numbers. Pitch diameters are not used as in the case of the conventional gearing implementation because, while the two circular splines have definite pitch diameters, the two flex splines do not—their mechanical force transmitting engagement circle flexes all the time when operating. Though, regardless of whether it is the convention gearing or strain wave gearing implementation, the dimensional discrepancy parameters, i and j in the case of conventional gearing and $T_i$ and $T_j$ for strain wave gearing, must be made as small as possible if large speed changing ratio is desired.

The strain wave gearing speed changing apparatus of FIG. 8A may have the wave generator 185E acting as the input, the second circular spline 184 as the output, and the first circular spline 181 the reaction member. Meanwhile, the two coaxial flex splines 182 and 183 that are fixed together move flexingly in the system. The illustrated speed changing apparatus of FIG. 8A has a speed change ratio of $T_K(T_K+T_i-T_j)/T_iT_j$. For such a spline-based system with a tooth number of $T_A$=63T (teeth), $T_B$=60T, $T_C$=57T and $T_D$=60T, or, $T_K$=60, $T_i$=3 and $T_j$=3, the speed changing—reduction—ratio is 400. Certainly the apparatus can also be used for speed increasing by swapping the input and output assignment.

FIG. 8B schematically illustrates that the pair of flex splines 182 and 183 are fixed together to form a single component of double flex spline component 188 for the speed changing apparatus of FIG. 8A. In a preferred embodiment of the strain wave gearing speed changing apparatus such as illustrated in FIG. 8A, component 188 can be made from one single piece of metallic tube. Two groups of spline teeth 182S and 183S are formed respectively on the exterior cylindrical surface of the flex splines 182 and 183. Note that only a few spline teeth are shown in the drawing although they will encircle the entire periphery of flex splines 182 and 183.

Also note that the double flex spline construction 188 of FIG. 8B made for the apparatus of FIG. 8A has equal spline tooth engagement pitch circle circumference lengths for its spines 182 and 183. This has the advantage of avoiding mechanical stress concentration between the two splines as they flex when operating—as in the case of the double spline construction of FIG. 4B. Such eased stress condition in the double spline component translates into improved device service life.

Note that to allow the two flex splines to have equal spline tooth engagement pitch circle circumference length, their "effective module," the equivalent to the module number for conventional gears, must be different from each other due to their different spline tooth numbers. This does not cause problem in practical implementations because splines are much easier to make than gears.

Figures 8C, 8D:
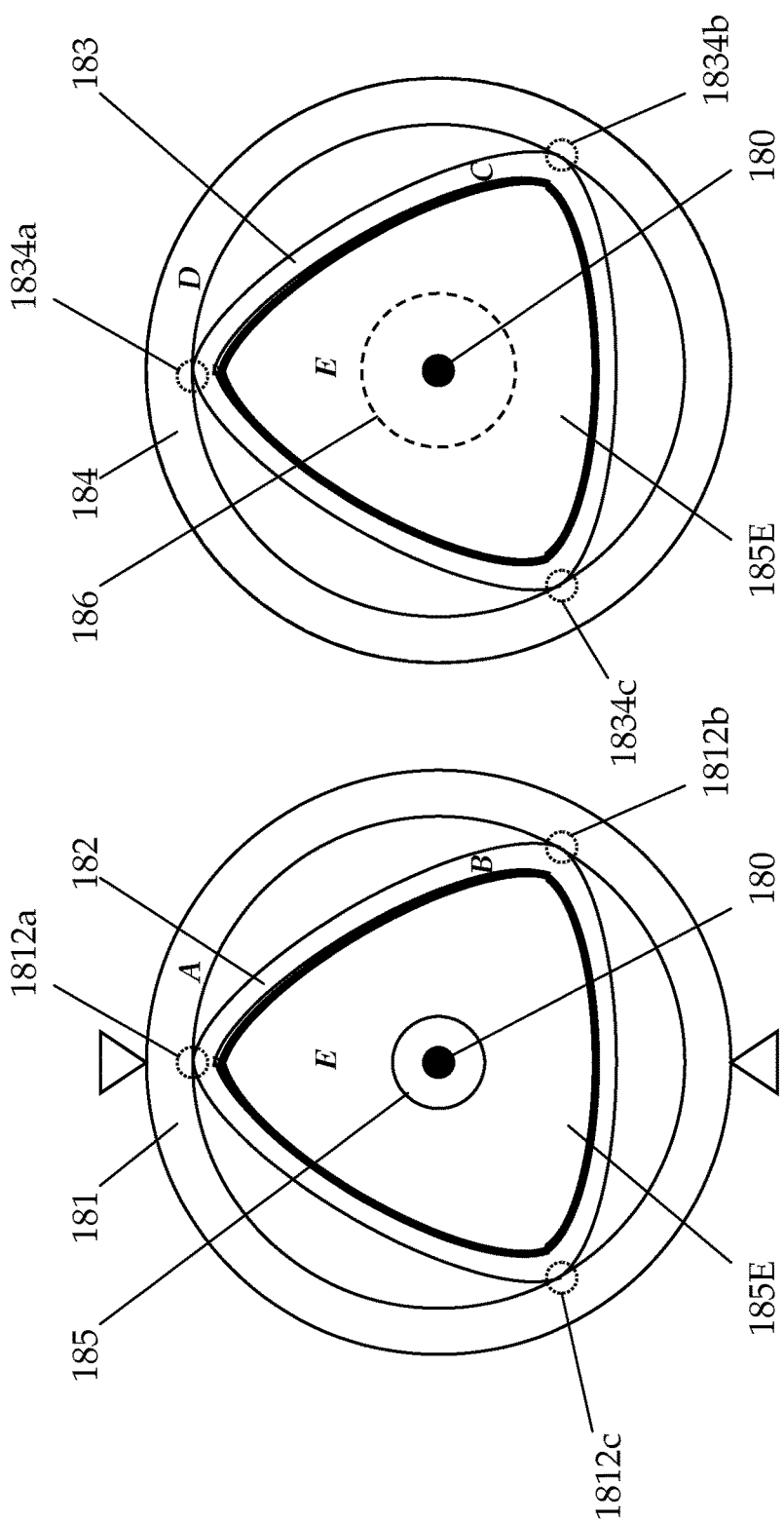
FIG. 8C schematically illustrates the cross-sectional view of the speed changing apparatus of FIG. 8A taken along the 8C-8C line.
FIG. 8D schematically illustrates the cross-sectional view of the speed changing apparatus of FIG. 8A taken along the 8D-8D line.

FIG. 8C schematically illustrates the cross-sectional view of the speed changing apparatus of FIG. 8A taken along the 8C-8C line and FIG. 8D the cross-sectional view taken along the 8D-8D line. Note that when compared to the counter parts in FIGS. 4C and 4D, a total of three spline tooth meshings both between the circular and flexing spline pair 181 and 182 and between pair 184 and 183 increases the load capacity for the speed changing apparatus.

As an example, take the exemplified 400-to-1 reduction ratio apparatus of FIG. 8A described above with a tooth number of $T_A$=63T (teeth), $T_B$=60T, $T_C$=57T and $T_D$=60T, or, $T_K$=60, $T_i$=3 and $T_j$=3. There are 21 spline teeth of the first circular spline 181 between its meshing teeth identified in FIG. 8C at 1812a and 1812b and 20 spline teeth of the first flex spline 182 between the same two meshing teeth at 1812a and 1812b. This is possible as there is at least one tooth discrepancy between the two meshing points (1812a and 1812b) on the two engaging splines 181 and 182. The same situation goes between the meshing points 1812b and 1812c for the two splines and between 1812c and 1812a.

For the second engagement pair shown in FIG. 8D, there are 20 spline teeth of the second circular spline 184 between its meshing teeth identified in FIG. 8D at 1834a and 1834b and 19 spline teeth of the second flex spline 183 between the same two meshing teeth at 1834a and 1834b. This is acceptable as there is one tooth discrepancy between the two meshing points (1834a and 1834b) on the two engaging splines 184 and 183. The same situation goes between the meshing points 1834b and 1834c for the two splines and between 1834c and 1834a.

For this example the meshing distribution can be arranged in perfect symmetry that the rotary component, namely, the two flex splines 182 and 183 shaped by the wave generator 185E can be well balanced all the time as the system operates. There is no issue of center of mass.

As another example, assume the apparatus of FIG. 8A has $T_A$=63T, $T_B$=59T, $T_C$=57T and $T_D$=61T, or, $T_K$=63, $T_i$=4 and $T_j$=2. According to Table 3 above the system has a reduction ratio of 449.875. For meshing arrangement among the three meshing points, there can be 21 spline teeth of the first circular spline 181 between its meshing teeth identified in FIG. 8C at 1812a and 1812b and 20 spline teeth of the first flex spline 182 between the same two meshing teeth at 1812a and 1812b. This is possible as there is one tooth discrepancy between the two meshing points (1812a and 1812b) on the two engaging splines 181 and 182. The same situation goes between the meshing points 1812b and 1812c for the two splines. But between 1812c and 1812a, there are 21 spline teeth of the spline 181 but 19 teeth on spline 182, a discrepancy of 2 teeth.

For the second engagement pair in FIG. 8D, there are 20 spline teeth of the second circular spline 184 between its meshing teeth identified in FIG. 8D at 1834a and 1834b and 19 spline teeth of the second flex spline 183 between the same two meshing teeth at 1834a and 1834b. There is one tooth discrepancy between the two meshing points (1834a and 1834b) on the two engaging splines 184 and 183. The same situation goes between the meshing points 1834b and 1834c for the two splines. But and between 1834c and 1834a, there are 21 spline teeth of the spline 184 but 19 teeth on spline 183, a discrepancy of 2 teeth.

For this example the meshing distribution can not be arranged in perfect symmetry that the rotary component, namely, the two flex splines 182 and 183 shaped by the wave generator 185E can be well balanced all the time as the system operates. However, the center of mass of the wave generator can be easily corrected as the deviation is small.

Figure 9B:
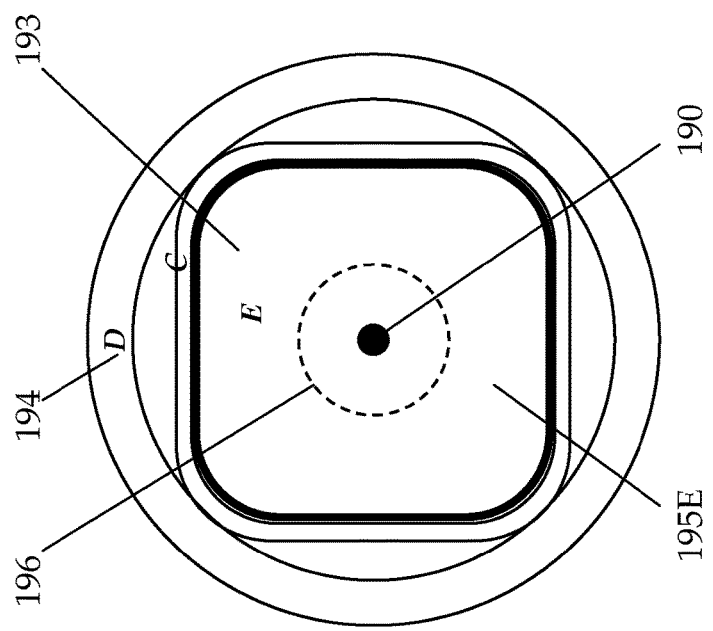
FIG. 9B schematically illustrates the cross-sectional view of the preferred embodiment of the speed changing apparatus of the present invention for FIG. 9A similar to FIG. 8D.
Figure 9A:
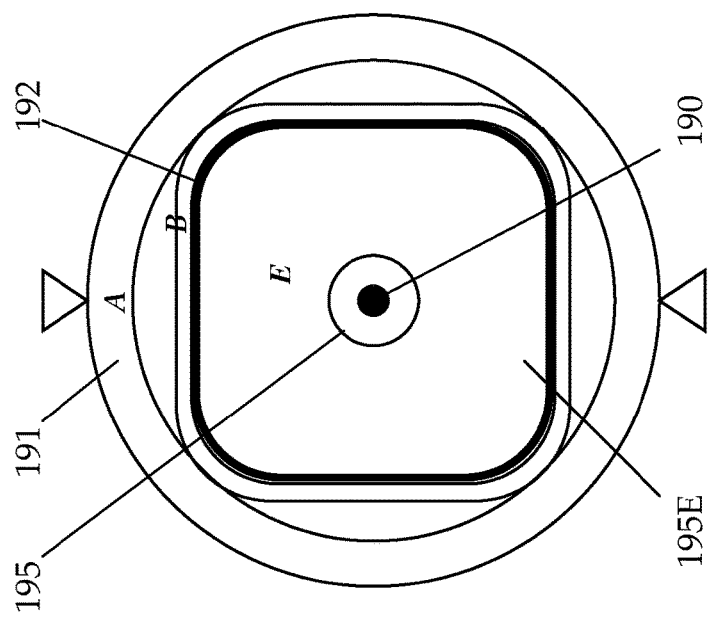
FIG. 9A schematically illustrates the cross-sectional view of another preferred embodiment of the speed changing apparatus of the present invention similar to FIG. 8C.

FIG. 9A schematically illustrates the cross-sectional view of another preferred embodiment of the speed changing apparatus of the present invention similar to FIG. 8C and FIG. 9B similar to FIG. 8D. The speed changing apparatus exemplified in FIGS. 9A and 9B has even more power capacity than that of FIGS. 8C and 8D because it has four meshings as compared to three.

Note, however, that while more meshing points allow for increase capacity, yet if only one single meshing is used, the flexing of the flexing splines can, substantially, be avoided. In this extreme case of configuration, the service life of the speed changing apparatus can be optimized, with the sacrifice of power capacity of course.

While the above is a full description of the specific embodiments, various modifications, alternative constructions and equivalents may be used. Therefore, the above description and illustrations should not be taken as limiting the scope of the present invention.

What is claimed is:

1. A strain wave gearing speed changing apparatus for changing an input speed at an input shaft to an output speed at an output shaft, the apparatus comprising:
a coaxial pair of circular splines including a first circular spline having a spline tooth number $T_A$ and a second circular spline having a spline tooth number $T_D$;
a coaxial pair of flex splines including a first flex spline having a spline tooth number $T_B$ and a second flex spline having a spline tooth number $T_C$; the first flex spline meshing with the first circular spline and the second flex spline meshing with the second circular spline, forming two meshing pairs; and
a wave generator connected to one of the input and output shafts of the apparatus;
wherein
the coaxial pair of flex splines being fixed together to operate flexingly on the wave generator and having equal spline tooth engagement pitch circle circumference lengths;
one circular spline being fixed to a frame of the apparatus and another circular spline being connected to another of the input and output shafts that is not connected to the wave generator; and
the coaxial pairs of circular and flex splines satisfying spline tooth number relationships of $T_A=T_K+T_i$, $T_B=T_K$, $T_C=T_K-T_j$ and $T_D=T_K+T_i-T_j$.

2. The apparatus of claim 1 wherein both $T_i$ and $T_j$ are smaller than 5.

3. The apparatus of claim 1 wherein $T_K/T_i$ is smaller than about 30/1 or $T_K/T_j$ is smaller than about 30/1.

4. The apparatus of claim 1 wherein $T_i$ equals $T_j$.

5. The apparatus of claim 1 wherein the wave generator is connected to the input shaft.

6. The apparatus of claim 1 wherein the wave generator is connected to the output shaft.

7. A strain wave gearing speed changing apparatus for changing an input speed at an input shaft to an output speed at an output shaft, the apparatus comprising:
a coaxial pair of circular splines including a first circular spline having a spline tooth number $T_A$ and a second circular spline having a spline tooth number $T_D$;
a coaxial pair of flex splines including a first flex spline having a spline tooth number $T_B$ and a second flex spline having a spline tooth number $T_C$; the first flex spline meshing with the first circular spline and the second flex spline meshing with the second circular spline, forming two meshing pairs; and
a wave generator connected to the input shaft of the apparatus;
wherein
the coaxial pair of flex splines being fixed together to operate flexingly on the wave generator and having equal spline tooth engagement pitch circle circumference lengths;
one circular spline being fixed to a frame of the apparatus and another circular spline being connected to the output shaft that is not connected to the wave generator: and
the coaxial pairs of circular and flex splines satisfying spline tooth number relationships of $T_A=T_K+T_i$, $T_B=T_K$, $T_C=T_K-T_j$ and $T_D=T_K+T_i-T_j$.

8. The apparatus of claim 7 wherein both $T_i$ and $T_j$ are smaller than 5.

9. The apparatus of claim 7 wherein $T_K/T_i$ is smaller than about 30/1 or $T_K/T_j$ is smaller than about 30/1.

10. The apparatus of claim 7 wherein $T_i$ equals $T_j$.

11. A strain wave gearing speed changing apparatus for changing an input speed at an input shaft to an output speed at an output shaft, the apparatus comprising:
a coaxial pair of circular splines including a first circular spline having a spline tooth number $T_A$ and a second circular spline having a spline tooth number $T_D$;
a coaxial pair of flex splines including a first flex spline having a spline tooth number $T_B$ and a second flex spline having a spline tooth number $T_C$; the first flex spline meshing with the first circular spline and the second flex spline meshing with the second circular spline, forming two meshing pairs; and
a wave generator connected to the output shaft of the apparatus;
wherein
the coaxial pair of flex splines being fixed together to operate flexingly on the wave generator and having equal spline tooth engagement pitch circle circumference lengths;
one circular spline being fixed to a frame of the apparatus and another circular spline being connected to the input shaft that is not connected to the wave generator; and
the coaxial pairs of circular and flex splines satisfying spline tooth number relationships of $T_A=T_K+T_i$, $T_B=T_K$, $T_C=T_K-T_j$ and $T_D=T_K+T_i-T$.

12. A strain wave gearing speed changing apparatus for changing an input speed at an input shaft to an output speed at an output shaft, the apparatus comprising:
a coaxial pair of circular splines including a first circular spline having a spline tooth number $T_A$ and a second circular spline having a spline tooth number $T_D$;
a coaxial pair of flex splines including a first flex spline having a spline tooth number $T_B$ and a second flex spline having a spline tooth number $T_C$; the first flex spline meshing with the first circular spline and the second flex spline meshing with the second circular spline at two or more meshing engagements, forming two meshing pairs; and
a wave generator connected to one of the input and output shafts of the apparatus;
wherein
the coaxial pair of flex splines being fixed together to operate flexingly on the wave generator;
one circular spline being fixed to a frame of the apparatus and another circular spline being connected to another of the input and output shafts that is not connected to the wave generator; and
the coaxial pairs of circular and flex splines satisfying spline tooth number relationships of $T_A=T_K+T_i$, $T_B=T_K$, $T_C=T_K-T_j$ and $T_D=T_K+T_i-T_j$.

13. The apparatus of claim 12 wherein both $T_i$ and $T_j$ are smaller than 5.

14. The apparatus of claim 12 wherein $T_K/T_i$ is smaller than about 30/1 or $T_K/T_j$ is smaller than about 30/1.

15. The apparatus of claim 12 wherein $T_i$ equals $T_j$.

16. The apparatus of claim 12 wherein the wave generator is connected to the input shaft.

17. The apparatus of claim 12 wherein the wave generator is connected to the output shaft.

18. A strain wave gearing speed changing apparatus for changing an input speed at an input shaft to an output speed at an output shaft, the apparatus comprising:
a coaxial pair of circular splines including a first circular spline having a spline tooth number $T_A$ and a second circular spline having a spline tooth number $T_D$;
a coaxial pair of flex splines including a first flex spline having a spline tooth number $T_B$ and a second flex spline having a spline tooth number $T_C$; the first flex spline meshing with the first circular spline and the second flex spline meshing with the second circular spline at two or more meshing engagements, forming two meshing pairs; and a wave generator connected to the input shaft of the apparatus;

wherein the coaxial pair of flex splines being fixed together to operate flexingly on the wave generator;

one circular spline being fixed to a frame of the apparatus and another circular spline being connected to the output shaft that is not connected to the wave generator; and the coaxial pairs of circular and flex splines satisfying the dimensional spline tooth number relationships of $T_A=T_K+T_i$, $T_B=T_K$, $T_C=T_K-T_j$ and $T_D=T_K+T_i-T_j$.

19. The apparatus of claim 18 wherein both $T_i$ and $T_j$ are smaller than 5.

20. The apparatus of claim 18 wherein $T_K/T_i$ is smaller than about 30/1 or $T_K/T_j$ is smaller than about 30/1.

21. The apparatus of claim 18 wherein $T_i$ equals $T_j$.

22. A strain wave gearing speed changing apparatus for changing an input speed at an input shaft to an output speed at an output shaft, the apparatus comprising:

a coaxial pair of circular splines including a first circular spline having a spline tooth number $T_A$ and a second circular spline having a spline tooth number $T_D$;

a coaxial pair of flex splines including a first flex spline having a spline tooth number $T_B$ and a second flex spline having a spline tooth number $T_C$; the first flex spline meshing with the first circular spline and the second flex spline meshing with the second circular spline at two or more meshing engagements, forming two meshing pairs; and a wave generator connected to the output shaft of the apparatus;

wherein the coaxial pair of flex splines being fixed together to operate flexingly on the wave generator;

one circular spline being fixed to a frame of the apparatus and another circular spline being connected to the input shaft that is not connected to the wave generator; and the coaxial pairs of circular and flex splines satisfying spline tooth number relationships of $T_A=T_K+T_i$, $T_B=T_K$, $T_C=T_K-T_j$ and $T_D=T_K+T_i-T$.

23. A strain wave gearing speed changing apparatus for changing an input speed at an input shaft to an output speed at an output shaft, the apparatus comprising:

a coaxial pair of circular splines including a first circular spline having a spline tooth number $T_A$ and a second circular spline having a spline tooth number $T_D$;

a coaxial pair of flex splines including a first flex spline having a spline tooth number $T_B$ and a second flex spline having a spline tooth number $T_C$; the first flex spline meshing with the first circular spline and the second flex spline meshing with the second circular spline at a single meshing engagement, forming two meshing pairs; and a wave generator connected to one of the input and output shafts of the apparatus;

wherein the coaxial pair of flex splines being fixed together to operate flexingly on the wave generator and having equal spline tooth engagement pitch circle circumference lengths;

one circular spline being fixed to a frame of the apparatus and the other spline of another circular spline being connected to another of the input and output shafts that is not connected to the wave generator; and the coaxial pairs of circular and flex splines satisfying spline tooth number relationships of $T_A=T_K+T_i$, $T_B=T_K$, $T_C=T_K-T_j$ and $T_D=T_K+T_i-T_j$.

* * * * *